Aug. 22, 1944.  E. H. KREMER ET AL  2,356,249
METHOD OF MAKING BELTS
Original Filed April 12, 1941
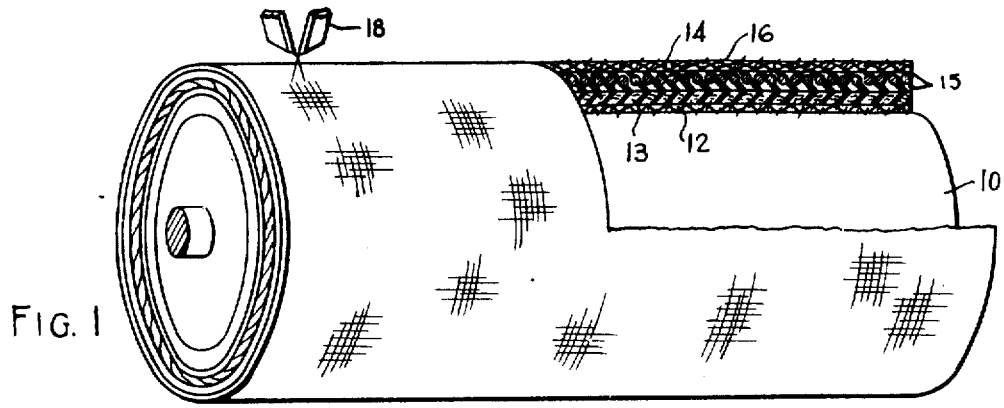
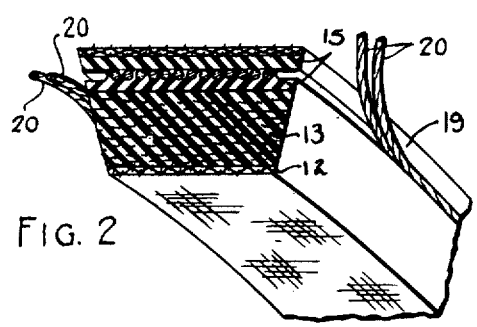
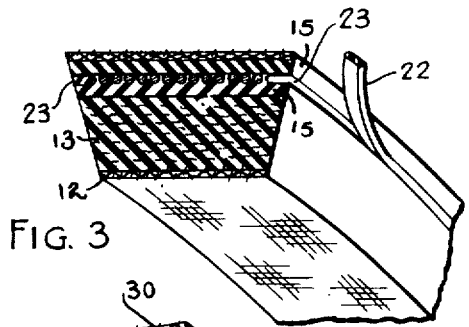
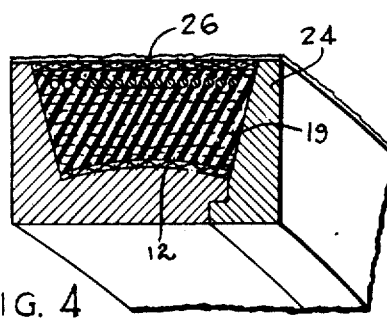
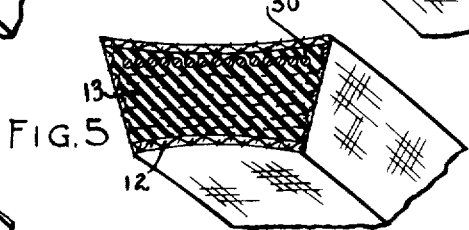
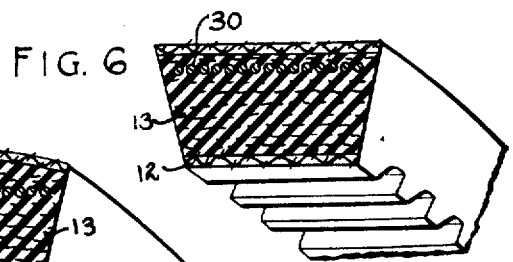
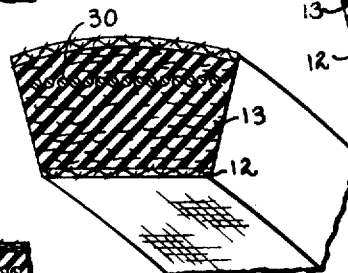
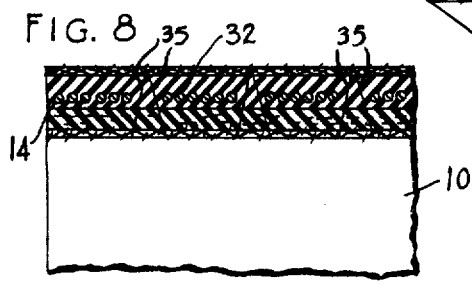
INVENTORS
EDWARD H. KREMER
HARRY W. KENNEY
BY
ATTORNEYS Patented Aug. 22, 1944

2,356,249

UNITED STATES PATENT OFFICE 2,356,249

METHOD OF MAKING BELTS

Edward H. Kremer and Harry W. Kenney, Dayton, Ohio, assignors to The Dayton Rubber Manufacturing Company, Dayton, Ohio, a corporation of Ohio Original application April 12, 1941, Serial No. 388,208. Divided and this application September 15, 1941, Serial No. 410,820

6 Claims. (Cl. 154—4)

This invention relates to method of making belts and is a division of our co-pending application, Serial No. 388,208, filed April 12, 1941.

One object of this invention is to provide a belt having a neutral axis layer comprising cords wherein the cord layer does not extend to the side walls of the belt, thereby producing an improved belt.

Another object is to provide a belt comprising rubber or synthetic rubber having a plurality of fine textile fibers arranged parallel to each other and transversely of the belt and wherein the neutral axis is made up of cords which form a layer spaced from the side walls of the belt.

Another object is to build up a belt from "Stiflex" and rubberized fabric including a cord layer which is spaced from the side walls of the belt to provide a belt having the desired flexibility and inextensibility and wherein the outer edges of the cord layer are protected from wear by a substantial thickness of "Stiflex".

Another object is to provide an improved method of making belts in which the neutral axis section is enclosed in rubber and spaced from the sides of the belt.

Another object is to provide an improved method of making belts of the grooved, cog, raw edge and wrapped or plain type which are built up of "Stiflex", rubberized fabric and cords wherein the cords immediately adjacent the working surfaces of the belt are removed and replaced with "Stiflex".

These and other objects and advantages will become apparent from the following description taken in connection with the drawing, wherein Figure 1 illustrates in perspective and partly in section a belt body comprising superimposed layers forming the belt wound on a mandrel or drum from which a belt or belts of the desired width can be cut;

Figure 2 is a fragmentary sectional view illustrating the step of removing the outer cords adjacent the side walls of the belt;

Figure 3 is a similar view as Figure 2, illustrating the step of inserting rubber composition stock in the space occupied by the cords which have been removed;

Figure 4 is a fragmentary sectional view taken through a mold showing the belt of Figure 3 in position to be molded;

Figure 5 is a diagrammatic view illustrating a wrapped belt wherein the cord forming the tension section of the belt is spaced from the side walls thereof and is embedded in rubber;

Figure 6 is a fragmentary sectional view illustrating a cog belt made according to this invention;

Figure 7 is a diagrammatic view illustrating a plain belt having an arched outer surface and a substantially flat inner or bottom surface;

Figure 8 is a fragmentary sectional view illustrating a modification wherein the neutral axis cords are wrapped on the rubber cushion layer so as to form spaced sections between which belts of the desired width are to be cut.

In general, belts of the raw edge and molded type and those comprising a thin cover or wrapper having a cord layer which extends from side to side of the belt have shown a tendency to work the outer cords adjacent the side walls of the belt loose from the body of the belt during use which shortens the life of the belt. Further, it has been discovered that where the outer strands forming the cord layer are spaced from the side walls the tendency aforementioned is overcome and a longer life belt is produced. We have discovered that belts can be made so that the cord layer does not extend to the side walls of the belt by building up the belt body on a drum or mandrel and cutting belts of the proper width and shape from this built-up body. Thereafter, one or more strands of cord adjacent the side walls of the cut belt are removed and the space filled with additional rubber composition prior to vulcanizing the material to produce the finished belt.

Ordinarily when a wrapped belt is made comprising a plurality of rubberized fabric layers forming the cover or wrapper, it is not necessary to remove the outer cords since the cover or wrapper forms additional side wall portions which substantially protect the outer cord layer section of the belt. However, where only one or two layers form the outer wrapper, if desired, the outer cord strands immediately adjacent the side walls of the belt may be removed and filled with rubber prior to applying the wrapper. Cog belts of different shapes and sizes may also be made according to this invention so as to protect the neutral axis cord layer from wear adjacent the side wall working surface of the belt.

Figures 1 to 4 in the drawing illustrate in detail a typical example of the method of making belts which is the subject of the present invention. In the drawing, this method is illustrated in the following steps:

Step I

The belt body is made up of different layers, as shown in Figure 1, which are applied on a drum or mandrel 10 having the desired diameter or circumference of the finished belt. In the making of the plain belt, as illustrated, there is first applied a rubberized fabric liner 12 comprising bias-laid square woven fabric over which is applied a "Stiflex" layer 13. There is placed over the "Stiflex" portion a rubber cushion layer 15 and over this is wound a cord layer 14 which forms the neutral axis section of the belt. The cords are embedded in the rubber cushion layer as illustrated in Figure 1. Finally there is applied the outermost rubberized fabric layer 16. This outer rubberized fabric layer may comprise one or more plies of bias-laid square woven fabric impregnated with rubber. If desired, however, the belt may be built omitting the rubberized layer 16.

*Step II*

After the belt body has been built up on the drum or mandrel 10, a belt or belts of the desired shape and width are cut therefrom by applying knives 18 to produce one or more endless belts, as illustrated at 19 in Figure 2.

*Step III*

The outermost cords, as shown at 20, are then pulled out of the side walls of the cut belt. One or more cord strands may be thus removed from the built-up belt body, as illustrated in Figure 2. There is then applied a filler 22 of rubber composition, such as "Stiflex" to fill up the space 23 taken by the cord strands 20 which were removed. The belt body is then ready for vulcanization or curing.

*Step IV*

The finished belt is then placed in a ring mold 24 having the desired shape to which the belt is to be molded and a rag wrapper 26 applied around the outer surface to compress the belt body 19 so as to make it conform with the mold. The mold and belt body are then placed in a suitable heating chamber and heated to a vulcanizing temperature as conventional to produce a tough resilient hard rubber belt product.

As an alternative in place of molding the built-up belt body to provide a finished belt having the desired shape, the belt may be press cured to the desired shape. When the belt is press cured application of rag wrapper 26 is eliminated.

It is preferable to use "Stiflex" as the rubber composition. This material comprises rubber reinforced with fine, parallel, transversely disposed, textile fibers. The "Stiflex" is wound around the drum or mandrel and the ends dovetailed together to form a layer of uniform thickness. It will be understood that other rubber reinforced compositions may be utilized in place of "Stiflex" and that this invention is not limited to any particular rubber composition.

In Figures 5, 6 and 7 a wrapped, cog and plain belt, respectively, are diagrammatically illustrated showing the spacing of the cord neutral axis layers 30 from the side wall working surfaces of the belt. These belts are made similarly as described and illustrated in Figures 1 to 4, inclusive.

As a modification of the method of removing the cords prior to vulcanization, there is illustrated in Figure 8 a method whereupon the cord layer of the belt body built-up on the mandrel 10 is formed of individual groups of cords 32 spaced from each other between which the knives are adapted to be positioned for cutting the belts to the desired width and shape without severing the cords 14. In this modified method, the desired width of the cord layers 32 forming the neutral axis of the several belts which are to be cut along the lines 35 is wound onto the rubber composition compression layer at predetermined spaced intervals laterally of the mandrel and the belts cut out between the spaced cord sections, as at 35, eliminating the removal of the cords and filling of the space with rubber composition, as described in Step III.

The preferred method, however, is to wind the cord continuously throughout the width of the mandrel, as shown in Figure 1, cut the belts therefrom and then remove several cord strands adjacent the side walls of the belt and fill the space with "Stiflex" before vulcanizing the product to produce a finished belt.

It will be understood that in practicing our process, the term "rubber" includes synthetic rubber or equivalent rubber or resinous products. Further, it is likewise obvious that the number of plies of rubberized fabric and cord layers and the thickness and size or shape of the belt may be varied to meet the particular conditions to which the belt is to be subjected in use.

It will be further understood that this invention is not limited to the particular method and specific materials described herein but may be modified to suit varying conditions and uses within the scope of the claims.

What we claim is:

1. The method of making a belt which comprises: wrapping a plurality of layers of rubber composition on a mandrel to provide a cylindrical belt body of the desired thickness, said belt body including a cord layer wound circumferentially of said belt body and embedded therein; cutting said cylindrical belt body to form an endless belt of the desired cross-sectional shape; removing the cord strands adjacent the side walls of the cut belt; filling the cavities left by the removal of said cord strands with rubber composition; and molding the belt body to provide a unitary vulcanized rubber belt of the desired shape.

2. The method of making a belt including cords embedded in rubber composition which comprises: building up a cylindrical belt body on a mandrel to form an endless belt; cutting said belt body into belts of the desired width; removing the strands of cord immediately adjacent the cut side walls of each belt and filling the space with rubber composition; and vulcanizing the belt body to unit the layers into an integral body.

3. The method of making a belt which comprises: building up a cylindrical belt body in the form of layers, including a cord layer, on a mandrel having the desired circumference of the finished belt; winding strands of cord circumferentially of said mandrel; applying an outer rubberized fabric layer comprising one or more plies of bias-laid square-woven fabric impregnated with rubber; cutting the belt body circumferentially of said mandrel to form at least one endless belt of the desired cross-sectional shape; removing the outermost cords adjacent the side walls of said endless belt; filling the space left by the removal of said cords with rubber composition; and vulcanizing the endless belt to produce a finished belt.

4. The method of making a belt which comprises: providing the belt body with a neutral axis cord layer, the outer strands of said cord layer being immediately adjacent the side walls of the belt; removing said outer strands of cord; filling the space from which said cords are removed with rubber; and vulcanizing the belt body to an integral structure.

5. The method of making a wrapped belt which comprises: wrapping a plurality of layers of rubber composition on a mandrel to provide a cylindrical belt body of the desired thickness, said belt body including a cord layer wound circumferentially of said belt body and embedded therein; cutting said cylindrical belt body to form an endless belt of the desired cross sectional shape; removing the cord strands adjacent the side walls of the cut belt; filling the cavities left by the removal of said cord strands with rubber composition; applying an outer wrapper of rubberized fabric; and molding the wrapped belt body in a mold adapted to form a unitary vulcanized rubber belt having a cogged underside.

6. The method of making a plurality of belts formed of rubber composition and including a cord layer which comprises building up a cylindrical belt body in the form of superimposed layers on a mandrel by positioning a cushioning layer of rubber composition on said mandrel, winding a cord layer on said cushioning layer in separate and individual groups of cords, said groups being laterally and substantially equidistantly spaced from each other, superimposing another layer of rubber composition on and around said cord layer; and cutting belts of the desired cross-sectional shape circumferentially of said mandrel and substantially intermediate said equidistantly spaced cord groups to produce individual belts wherein the cord layer is spaced remote from the side walls of said belts.

EDWARD H. KREMER.
HARRY W. KENNEY.